United States Patent
Kudoh

(10) Patent No.: US 7,289,796 B2
(45) Date of Patent: Oct. 30, 2007

(54) MOBILE COMMUNICATIONS TERMINAL DEVICE AND METHOD FOR IDENTIFYING INCOMING CALL FOR USE WITH THE SAME

(75) Inventor: Kazuhiro Kudoh, Tokyo (JP)

(73) Assignee: NEC Corporation, Tokyo (JP)

( * ) Notice: Subject to any disclaimer, the term of this patent is extended or adjusted under 35 U.S.C. 154(b) by 726 days.

(21) Appl. No.: 09/871,960

(22) Filed: Jun. 4, 2001

(65) Prior Publication Data

US 2002/0004384 A1 Jan. 10, 2002

(30) Foreign Application Priority Data

Jul. 6, 2000 (JP) ............................. 2000-169925

(51) Int. Cl.
*H04M 3/42* (2006.01)
(52) U.S. Cl. ................................. 455/415; 379/142.06
(58) Field of Classification Search ................ 455/415,
455/343.21, 563, 566, 567, 414.1, 413, 414.2,
455/414.3, 414.4, 343.2; 379/354, 88.19,
379/88.21, 142.06
See application file for complete search history.

(56) References Cited

U.S. PATENT DOCUMENTS

| | | | | |
|---|---|---|---|---|
| 5,646,979 | A * | 7/1997 | Knuth | 455/563 |
| 5,903,628 | A * | 5/1999 | Brennan | 379/88.21 |
| 6,473,621 | B1 * | 10/2002 | Heie | 455/466 |
| 6,606,508 | B2 * | 8/2003 | Becker et al. | 455/567 |
| 6,611,681 | B2 * | 8/2003 | Henderson | 455/413 |
| 6,618,586 | B2 * | 9/2003 | Inoue | 455/343.2 |
| 6,690,955 | B1 * | 2/2004 | Komiyama | 455/566 |
| 6,697,484 | B1 * | 2/2004 | Fleming, III | 379/354 |

FOREIGN PATENT DOCUMENTS

| | | |
|---|---|---|
| CN | 1134095 A | 10/1996 |
| DE | 0 895 392 A2 | 2/1999 |
| GB | 2 301 261 A | 11/1996 |
| GB | 2 333 209 A | 7/1999 |

(Continued)

OTHER PUBLICATIONS

Muramatsu, Communication Device To Inform A User Of A Call Differently According To The Caller, Dec. 13, 2001.*

(Continued)

*Primary Examiner*—Gerald Gauthier
(74) *Attorney, Agent, or Firm*—McGinn IP Law Group, PLLC

(57) ABSTRACT

To provide a mobile communications terminal device that can identify an originator in a unit of group or a discriminating ringing by depending on the kind of an incoming identification tone without regard to a display, and acquire information designating the originator in accordance with an external specification.

In a mobile communications terminal device 1, if there is any matched data in a retrieval from a telephone directory, the call is informed with an incoming identification tone specified by the kind of a call incoming and a telephone directory of a memory 17. If a switch is pressed on an operation section 11, a ringing of incoming identification tone from a voice output section 13 is stopped, and the voice information converted from a character string registered in the telephone directory of the memory 17 is output from the voice output section 13.

31 Claims, 6 Drawing Sheets

FOREIGN PATENT DOCUMENTS

| | | |
|---|---|---|
| JP | 06-141068 | 5/1994 |
| JP | 6-164712 | 6/1994 |
| JP | 06-164712 | 6/1994 |
| JP | 08-018628 | 1/1996 |
| JP | 08-265413 | 10/1996 |
| JP | 09-018550 | 1/1997 |
| JP | 9-018551 | 1/1997 |
| JP | 09-093309 | 4/1997 |
| JP | 11-46228 | 2/1999 |
| JP | 11-46240 | 2/1999 |
| JP | 11-112618 | 4/1999 |
| JP | 11-136765 | 5/1999 |
| JP | 11-163971 | 6/1999 |
| JP | 2000-124989 | 4/2000 |
| WO | WO93/26132 | 12/1993 |

OTHER PUBLICATIONS

English Translation of Chinese Office Action dated Apr. 11, 2003.
Japanese Office Action dated Oct. 28, 2003 with Partial English Translation.
United Kingdom Search Report dated Feb. 1, 2002.

* cited by examiner

MOBILE COMMUNICATIONS TERMINAL DEVICE AND METHOD FOR IDENTIFYING INCOMING CALL FOR USE WITH THE SAME

BACKGROUND OF THE INVENTION

1. Field of the Invention

The present invention relates to a mobile communications terminal device and a method for identifying an incoming call for use therewith, and more particularly to a method for identifying the information of an originator upon receiving an incoming call in the mobile communication terminal device.

2. Description of the Related Art

Conventionally, in the mobile communications terminal device, means for identifying the originator's information at the time of call incoming employs a method for displaying a telephone number or a mail address of the originator as the originator's information.

Also, in the mobile communications terminal device, there is another method for displaying the originator's information (which comprises a name of the originator) by registering a name of an originator along with the telephone number and the mail address as a telephone directory in its own terminal device, and retrieving the name or the like from the telephone directory by the telephone number or the mail address of the originator upon receiving an incoming call.

However, in the conventional mobile communications terminal device as described above, the user can not easily identify the originator's information according to a display of incoming call, at the time of carrying a portable terminal of folding structure, or at the time of holding a terminal of non-folding structure in the user's pocket.

Also, the originator's information may be obtained by associating the kinds of incoming identification tone with the originator or the contents of incoming call, but if a great number of originators are present, it is difficult to identify clearly the originator on the basis of the kind of abstract incoming identification tone.

SUMMARY OF THE INVENTION

Thus, it is an object of the invention to solve the aforementioned problems and to provide a mobile communications terminal device and a method for identifying an incoming call for use with the same terminal device, in which an originator in a unit of group or the kind of call incoming can be identified on the basis of the kind of incoming identification tone, without display, and the information designating the originator can be obtained in accordance with an external specification.

According to this present invention, there is provided a mobile communications terminal device including: storage means for registering beforehand the name of an originator, at least one of the telephone number and mail address of said originator, the kind of an incoming identification tone at the time of a call incoming from said originator, and a character string corresponding to the voice information designating said originator; voice output means for ringing with the kind of the incoming identification tone corresponding to said originator at the time of the call incoming; and control means for controlling said voice output means to output the voice information corresponding to the character string registered in said storage means in response to an external instruction while said voice output means is ringing.

Further, according to this present invention, there is provided a method for identifying an incoming call in a mobile communications terminal device comprising steps of: ringing with the kind of an incoming identification tone corresponding to an originator at the time of a call incoming; and outputting the voice information corresponding to a character string registered in storage means for registering beforehand the name of the originator, at least one of the telephone number and mail address of said originator, the kind of the incoming identification tone at the time of the call incoming from said originator, and the character string corresponding to the voice information designating said originator, in response to an external instruction during the ringing of said incoming identification tone.

That is, the method for identifying the incoming call according to the present invention includes effecting the voice output of the originator's information as means for discriminating the originator at the time of the call incoming in the mobile communications terminal device such as a portable telephone or the like, thereby enabling the identification to be made easily.

In the mobile communications terminal device of the present invention, since the originator's information is output apart from the incoming identification tone, upon activation by the user making a key input, in a state where the incoming identification tone is ringing at the time of the call incoming, the originator can be identified without regard to the display of the originator's information.

DESCRIPTION OF THE PREFERRED EMBODIMENTS

Figure 1:
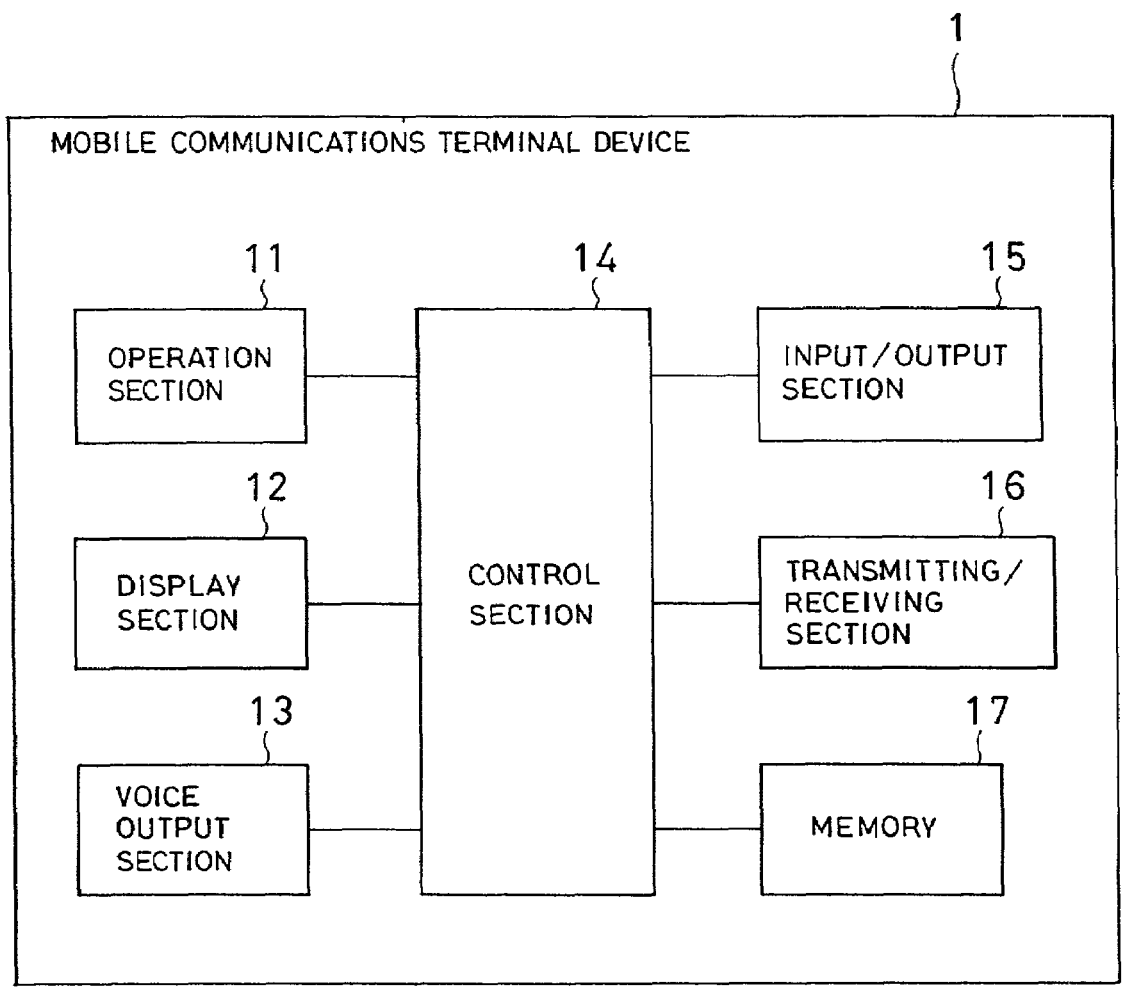
FIG. 1 is a block diagram showing a configuration of a mobile communications terminal device according to one embodiment of the present invention.

Next, the preferred embodiments of the present invention will be described below with reference to the accompanying drawings. FIG. 1 is a block diagram showing a configuration of a mobile communications terminal device according to one embodiment of the present invention. In the configuration of FIG. 1, the mobile communications terminal device has a voice output function of enabling the voice to be heard sufficiently without needs of bringing the terminal itself closer to the user's ear.

In FIG. 1, a mobile communications terminal device 1 comprises an operation section 11, a display section 12, a voice output section 13, a control section 14, an input/output section 15, a transmitting/receiving section 16 and a memory 17.

The operation section 11 accepts an operation to the terminal device, and the display section 12 displays the status of the terminal device and the required information. To inform an incoming call or a status change of the terminal device, the voice output section 13 outputs the incoming identification tone and the voice information obtained by decoding the ADPCM (Adaptive Differential Pulse Code Modulation) data.

The control section 14 controls the operation of each section constituting the terminal device. The input/output section 15 inputs and outputs the voice in telephone conversation, and the transmitting/receiving section 16 transmits or receives the data in the radio communication. The memory 17 saves the information or settings, and stores the common information or the set information of the terminal device, as well as the waveform information necessary for generating the waveform of the incoming identification tone and the ADPCM data required to produce the voice information.

Figure 2:
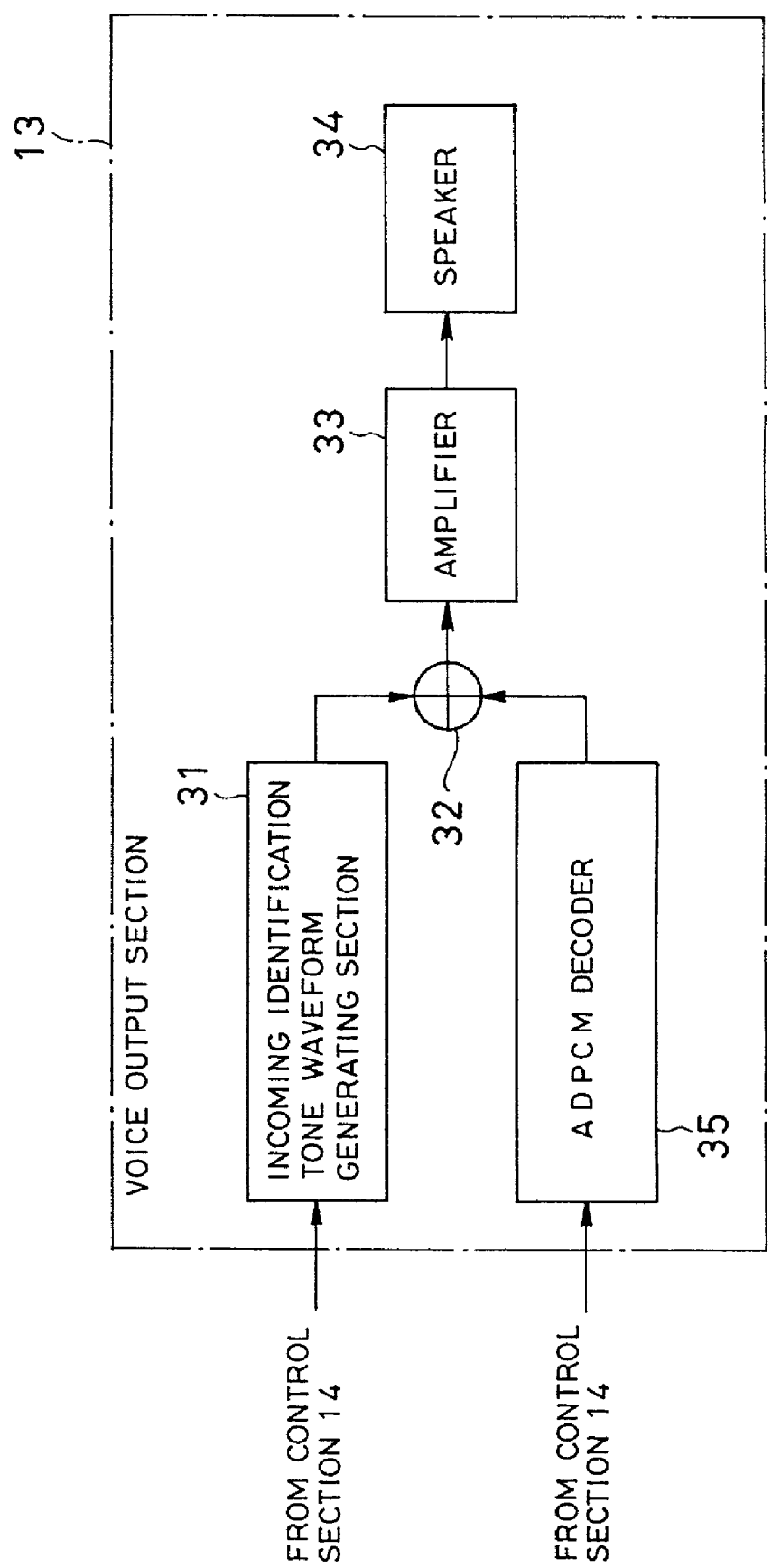
FIG. 2 is a block diagram showing an example of one configuration of a voice output section of FIG. 1.

FIG. 2 is a block diagram showing one configuration example of the voice output section 13 of FIG. 1. In FIG. 2, the voice output section 13 comprises an incoming identification tone waveform generating section 31, an adder 32, an amplifier 33, a speaker 34, and an ADPCM decoder 35.

In the voice output section 13, when an incoming identification tone rings, the waveform information of the incoming identification tone from the control section 14 is input into the incoming identification tone waveform generating section 31 to generate the wave form of the incoming identification tone, which is then amplified by the amplifier 33, and output as the audio output from the speaker 34, so that the incoming call is informed to the outside.

Also, in the voice output section 13, at the time of voice output, the ADPCM data from the control section 14 is input into the ADPCM decoder 35, decoded into an analog voice waveform, amplified by the amplifier 33, and output as the audio output from the speaker 34, so that the voice information with the ADPCM data is output to the outside.

Figure 3:
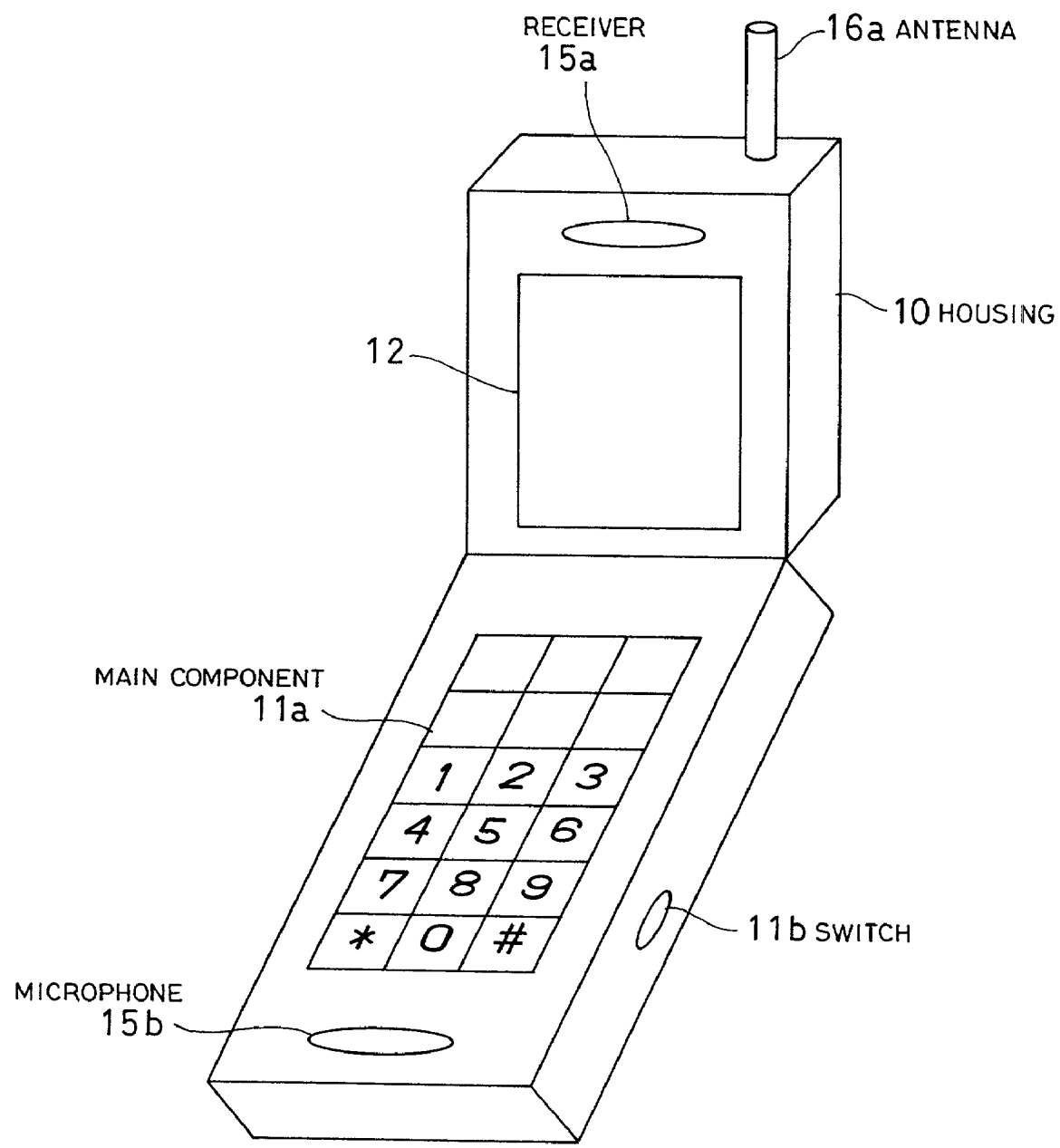
FIG. 3 is a perspective view of the mobile communications terminal device according to one embodiment of the present invention.

FIG. 3 is a perspective view of the mobile communications terminal device 1 according to one embodiment of the present invention. In FIG. 3, the mobile communications terminal device 1 has a housing 10 of folding structure. This terminal device is folded and carried in the normal state, and used by opening the housing 10 in the service or display operation.

An antenna 16a receives an electric wave to supply to the receiving circuit in the transmitting/receiving section 16, and radiates a high frequency output from a transmitting circuit as the electric wave. A receiver 15a outputs the received speech voice from the input/output section 15 in the voice service, with the receiver 15a placed onto the user's ear, and a microphone 15b inputs the user's voice as the sending speech voice into the input/output section 15 in the voice speech.

The display section 12 is disposed on the side of the receiver 15a of the folding structure, and the operation section 11 has a main component 11a disposed on the side of the microphone 15b of the folding structure, but a switch 11b placed on a lateral face of the housing 10 so that the user can operate it when the terminal device is folded.

Figure 4:
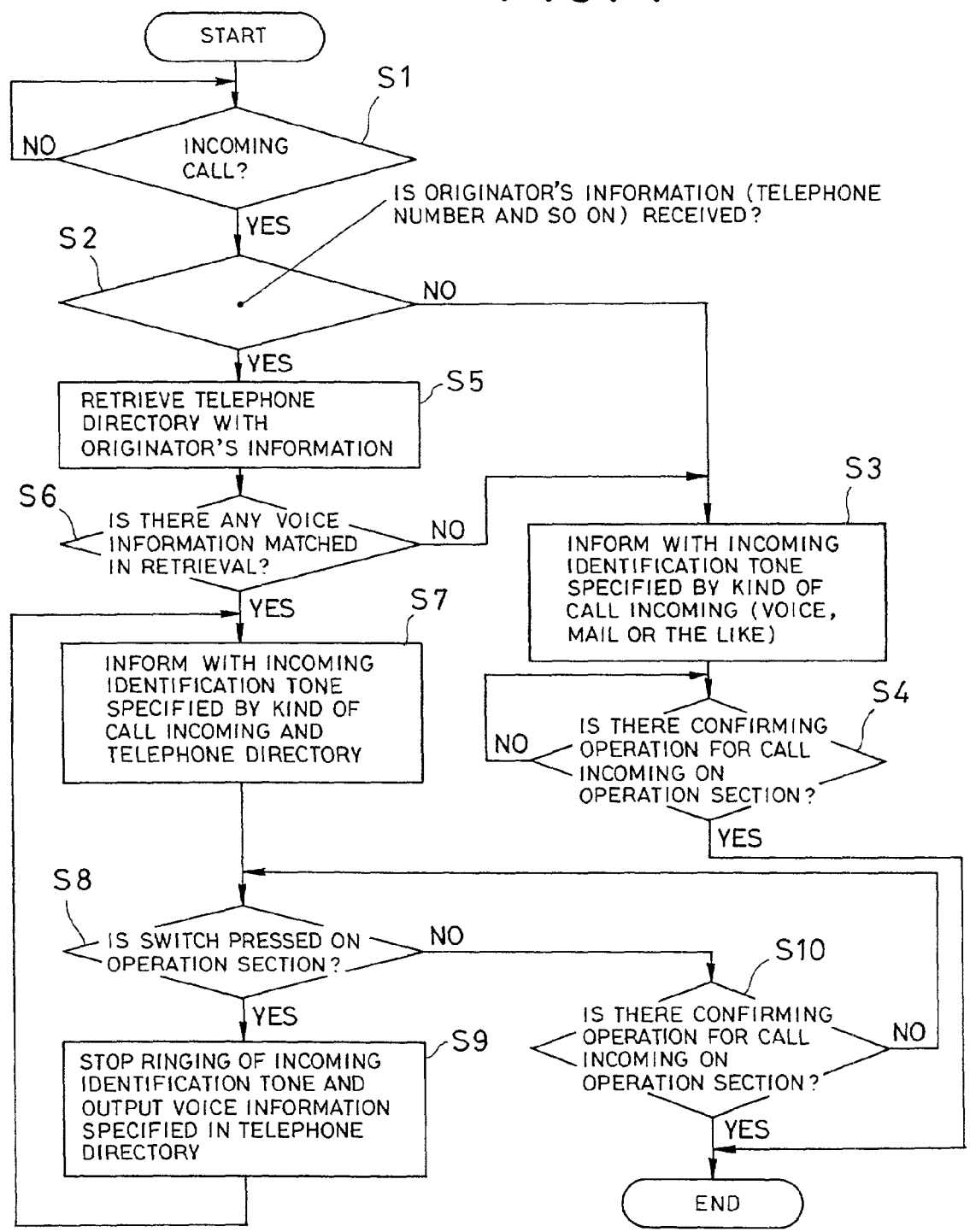
FIG. 4 is a flowchart showing an operation of the mobile communications terminal device according to one embodiment: of the present invention.

FIG. 4 is a flowchart showing the operation of the mobile communications terminal device according to one embodiment of the present invention. The operation of the mobile communications terminal device according to one embodiment of the present invention will be described below with reference to FIGS. 1 to 4.

First of all, in the mobile communications terminal device 1, a telephone directory editing function is initiated by an operation on the operation section 11. This telephone directory editing function enables the user to enter the name, the telephone number and mail address, and the kind of the incoming identification tone and the voice information as the characters on the operation section 11.

The telephone directory data created in this way is stored in the memory 17, and displayed on the display section 12, as required, by an operation on the operation section 11, whereby the user can inspect the information, and after inspection, performs a telephone call or mail to a destination which is inspected, by an operation on the operation section 11.

When a call or mail is received, the telephone number or mail address registered in the telephone directory can be retrieved by the originator's information (telephone number or mail address) transmitted to its terminal device to display the name of originator on the display section 12 at the time of call incoming.

If the kind of the incoming identification tone corresponding to the individual name is registered in the telephone directory data, the discriminating ringing for the telephone call, the mail or the like occurs along with the incoming identification tone according to the specific name. At this time, the waveform information corresponding to the kind of the incoming identification tone registered in the telephone directory for the name retrieved at the time of the call incoming is input into the incoming identification tone waveform generating section 31.

Further, if a character string corresponding to the voice information for the individual name is registered in the telephone directory, the ADPCM data stored beforehand in the memory 17 corresponding to the character string is input into the ADPCM decoder 35, and the voice information of the character string registered in the memory 17 is output from the speaker 34.

Generally, it is not necessarily beneficial to the user that the voice information is output with the incoming identification tone, because the originator's information may be heard in the surroundings. In this one embodiment of the present invention, the telephone call is ringing with the preset incoming identification tone at the time of the call incoming, and only when the user operates the switch 11b on the operation section 11 to prompt the output of the voice information, its voice information is superimposed.

When the user operates the switch 11b on the operation section 11 to prompt the output of the voice information, the voice information may be output by stopping the output of the incoming identification tone, whereby the voice information can be more easily heard. Further, the vibration of a vibrator, not shown, the voice information indicating the kind of the call incoming or the like, can be utilized instead of the incoming identification tone.

In the mobile communications terminal device 1, in the case where an incoming call occurs in its own device (step S1 in FIG. 4), if the originator's information (telephone number, mail address or the like) is not received (step S2 in FIG. 4), the call is informed with an incoming identification tone specified beforehand by the kind of the call incoming (telephone call, mail reception or the like) (step S3 in FIG. 4). This kind of the incoming identification tone includes an incoming identification tone melody having a variation such as gamut or the like. If a confirmation operation for the call incoming is made on the operation section 11 (step S4 in FIG. 4), the notification of the incoming identification tone is terminated.

In the mobile communications terminal device 1, when the originator's information is received at the time of the call incoming (steps S1, S2 in FIG. 4), the telephone directory is retrieved by the originator's information (step S5 in FIG. 4), and if there is no matched data in the retrieval (step S6 in FIG. 4), the call is informed with the incoming identification tone specified by the kind of the call incoming (step S3 in FIG. 4) in the same way as when the originator's information is not received. However, in one embodiment of this present invention, the character string of the originator's information can be also output as the voice information.

In the mobile communications terminal device 1, if there is matched data in the telephone directory (step S6 in FIG. 4), the call is informed with the incoming identification tone specified by the kind of the call incoming and the telephone directory (step S7 in FIG. 4). Thereafter, if the user presses the switch 11b on the operation section 11 (step S8 in FIG. 4), the ringing of the incoming identification tone is stopped and the voice information converted from the character string previously registered in the telephone directory is output (step S9 in FIG. 4).

When the output of the voice information is completed, the ringing of the incoming identification tone is resumed (step S7 in FIG. 4). In this case, it may be considered to make such a setting that the ringing is not resumed according to the user's preference. If a confirmation operation for the incoming call is made on the operation section 11 while the incoming identification tone is ringing (step S10 in FIG. 4), its incoming call operation is completed.

In this way, the contents of the incoming call or the originator can be identified to a certain level, based on the kind of the incoming identification tone. Hence, the user can obtain the primary identification information with the incoming identification tone. And further, at the time of performing an operation of the switch 11b, the user can purposely obtain the voice information corresponding to the character string designating the direct originator as the secondary designation information.

In particular, in the case where the originator's information can not be easily identified based on the display at the time of call incoming, such as when the user carries the terminal of folding structure, or contains the terminal of non-folding structure within the pocket or the like, the user can obtain the voice information designating the originator by making an operation of the switch 11b (according to the user's will).

If the kind of the incoming identification tone is associated with the kind of call incoming, a plurality of persons or a group, but not a single particular person, the originators can be narrowed to several names based on the incoming identification tone, and the originator can be further designated by the operation of the switch 11b. Accordingly, the facility at the time of call incoming can be enhanced in the situation where the user daily carries the mobile communications terminal device 1.

Figure 5:
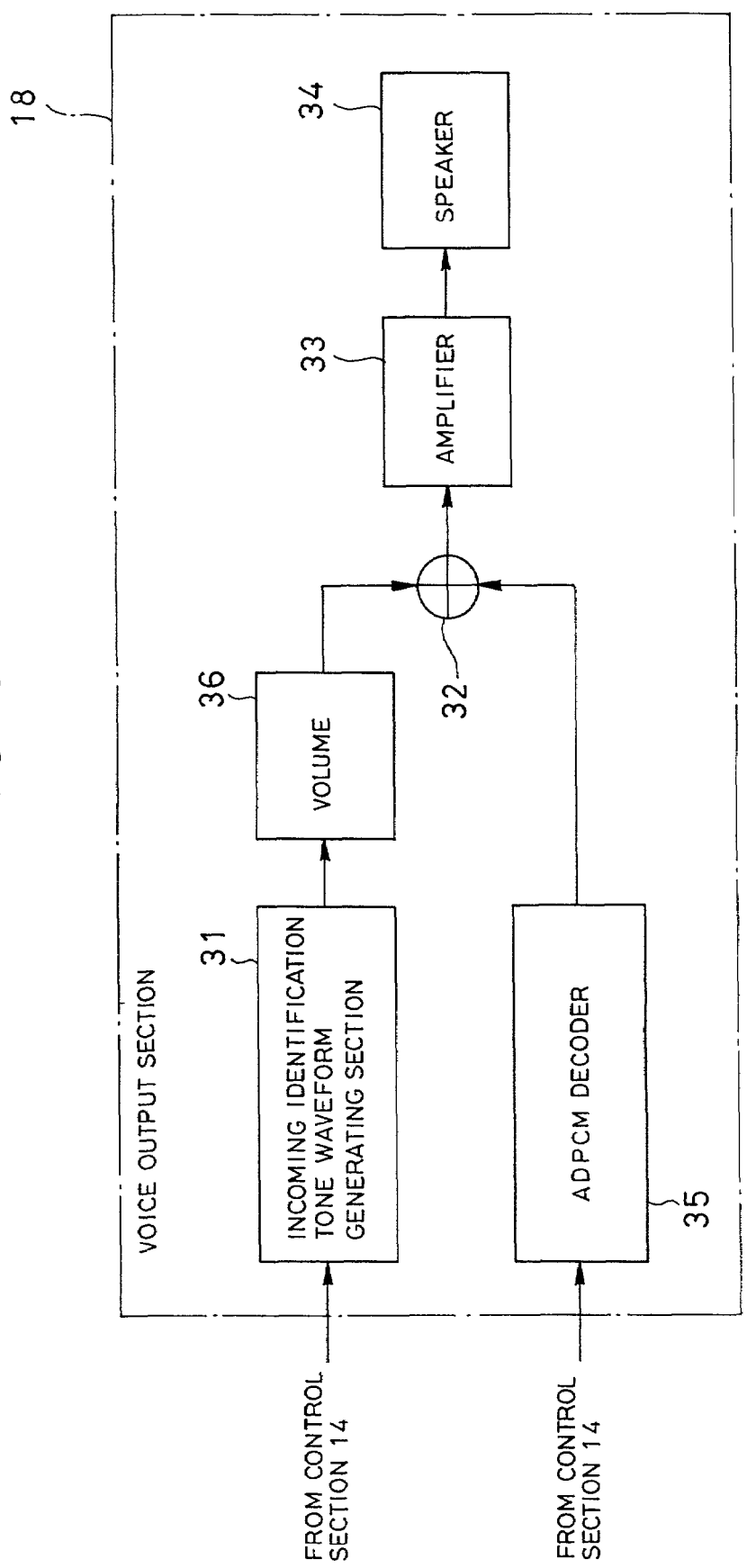
FIG. 5 is a block diagram showing an example of one configuration of a voice output section in the mobile communications terminal device according to another embodiment of the present invention.

FIG. 5 is a block diagram showing an example of one configuration of a voice output section in the mobile communications terminal device 1 according to another embodiment of the present invention. In FIG. 5, a voice output section 18 according to another embodiment of the present invention has the same configuration as the voice output section 13 according to the one embodiment of the present invention and shown in FIG. 2, except that a volume 36 is provided. In these drawings, the same numerals are attached to the same or like components. In operation, the same components perform the same or like functions as those of the one embodiment of the present invention.

In the voice output section 18, when the incoming identification tone is ringing, the waveform information of the incoming identification tone is input from the control section 14 into the incoming identification tone waveform generating section 31 to generate the waveform of the incoming identification tone, which is then amplified by the amplifier 33, and output as the audio output from the speaker 34, so that the incoming call is informed to the outside. In this case, the volume 36 is interposed between the incoming identification tone waveform generating section 31 and the amplifier 33, and enables the volume of the incoming identification tone to be changed relative to the voice output.

Also, in the voice output section 18, at the time of the voice output, the ADPCM data from the control section 14 is input into the ADPCM decoder 35, decoded into the analog voice waveform, amplified by the amplifier 33, and output as the audio output from the speaker 34, whereby the voice information with the ADPCM data is output to the outside.

Figure 6:
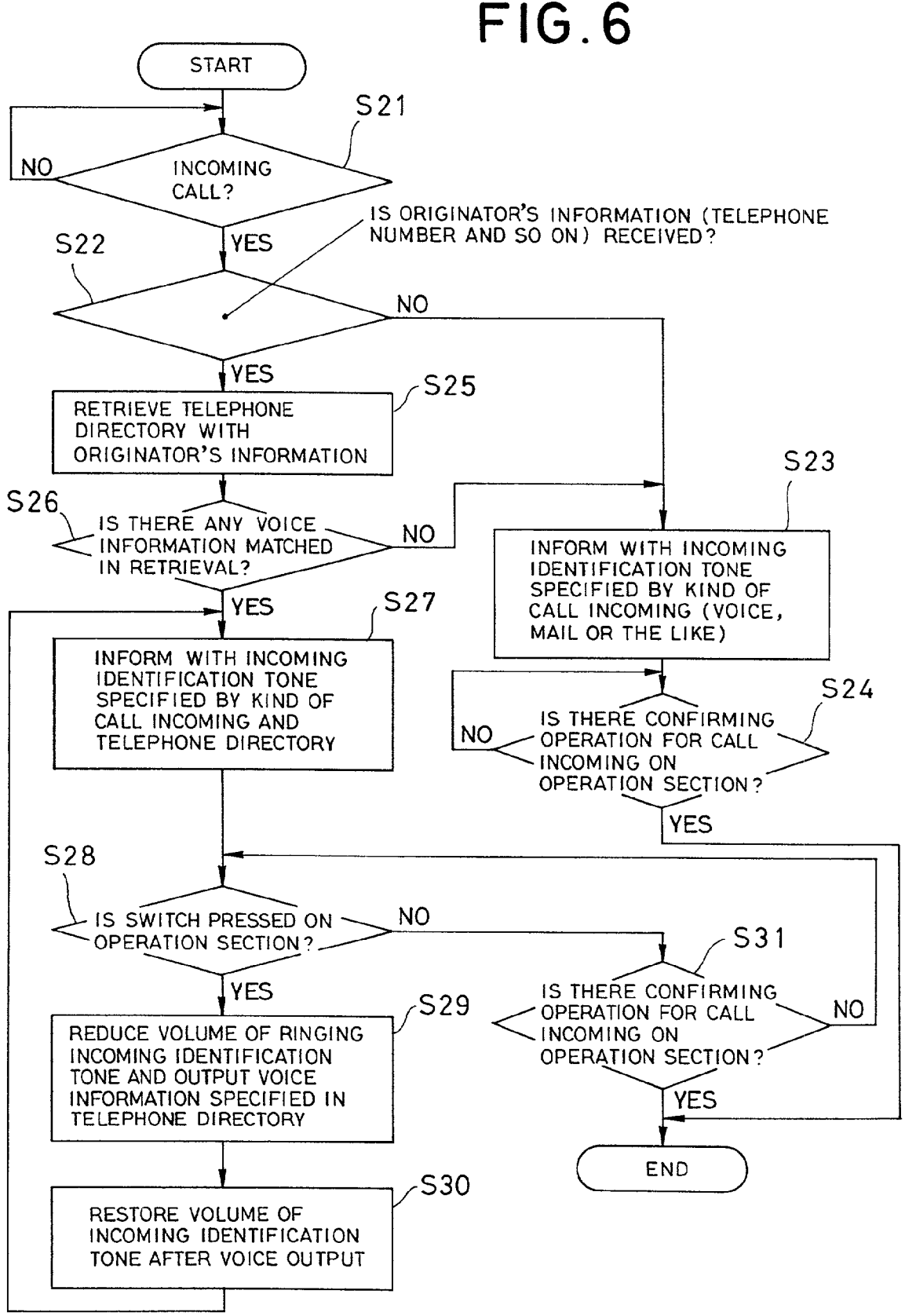
FIG. 6 is a flowchart showing the operation of the mobile communications terminal device according to another embodiment of the present invention.

FIG. 6 is a flowchart showing the operation of the mobile communications terminal device according to another embodiment of the present invention. Referring to FIGS. 1, 5 and 6, the operation of the mobile communications terminal device according to another embodiment of the present invention will be described below. The internal structure of the mobile communications terminal device according to another embodiment of the present invention is the same as that of FIG. 1, except that the voice output section 18 is disposed in place of the voice output section 13. Its appearance is shown in FIG. 3.

In the mobile communications terminal device 1, when the incoming call occurs in its own device (step S21 in FIG. 6), if the originator's information (telephone number, mail address or the like) is not received (step S22 in FIG. 6), the call is informed with the incoming identification tone specified beforehand by the kind of the call incoming (telephone call, mail reception or the like) (step S23 in FIG. 6). This kind of the incoming identification tone includes an incoming identification tone melody having a variation such as gamut or the like. If a confirmation operation for the call incoming is made on the operation section 11 (step S24 in FIG. 6), the notification of the incoming identification tone is terminated.

In the mobile communications terminal device 1, when the originator's information is received at the time of the call incoming (steps S21, S22 in FIG. 6), the telephone directory is retrieved by the originator's information (step S25 in FIG. 6), and if there is no matched data in the retrieval (step S26 in FIG. 6), the call is informed with the incoming identification tone specified by the kind of the call incoming (step S23 in FIG. 6) in the same way as when the originator's information is not received. However, in this another embodiment of the present invention, the character string of the originator's information can be also output as the voice information.

In the mobile communications terminal device 1, if there is matched data in the telephone directory (step S26 in FIG. 6), the call is informed with the incoming identification tone specified by the kind of the call incoming and the telephone directory (step S27 in FIG. 6). Thereafter, if the user presses the switch 11b on the operation section 11 (step S28 in FIG. 6), the volume of ringing the incoming identification tone is relatively reduced by a predetermined amount and the voice information converted from the character string previously registered in the telephone directory is output (step S29 in FIG. 6).

When the output of the voice information is completed, the volume of ringing the incoming identification tone is restored to its original volume (step S30 in FIG. 6), and the ringing of the incoming identification tone is resumed again (step S27 in FIG. 6). In this case, it may be considered to make such a setting that the ringing is not resumed according to the user's preference. If a confirmation operation for the incoming call is made on the operation section 11 while the incoming identification tone is ringing (step S31 in FIG. 6), the call incoming operation is completed.

In this way, the voice information is superimposed by reducing the volume of the incoming identification tone relatively at the time of outputting the voice information. Therefore, after the user obtains the primary identification information by ringing the incoming identification tone, the user can surely hear the voice information intentionally, and obtain the voice information designating the originator. Also, while the ringing of the incoming identification tone is continued, the user can obtain the voice information relatively unnoticeably, although the user may feel anxious about the voice output of the originator's information spreading over the surroundings in some cases.

As described above, this present invention has the effects that due to comprising including the steps of ringing with the kind of the incoming identification tone corresponding to the originator at the time of the call incoming, and outputting the voice information corresponding to the character string registered in storage means for registering beforehand the name of the originator, at least one of the telephone number and mail address of the originator, the kind of the incoming identification tone at the time of the call incoming from the originator, and the character string corresponding to the voice information designating the originator in response to an external instruction during the ringing of the incoming identification tone, it is possible to identify the originator in a unit of group or the discriminating ringing by depending on the kind of the incoming identification tone without regard to the display, and obtain the information designating the originator in accordance with an external specification.

What is claimed is:

1. A mobile communications terminal device, comprising:
   storage means for registering beforehand a name of an originator, one of a telephone number and a mail address of said originator, a kind of an incoming identification tone at a time of a call incoming from said originator, and a character string input by a user and corresponding to a voice information designating said originator;
   voice output means for ringing with the kind of the incoming identification tone corresponding to said originator at the time of the incoming call; and
   control means for controlling said voice output means to output the voice information corresponding to the character string registered beforehand in said storage means in response to an instruction received from said user while said voice output means is ringing.

2. The mobile communications terminal device according to claim 1, wherein said control means controls said voice output means to output said voice information after stopping said ringing in response to the instruction.

3. The mobile communications terminal device according to claim 1, wherein said control means controls said voice output means to output said voice information after reducing an output volume of ringing in response to the instruction.

4. The mobile communications terminal device according to claim 1, wherein said voice output means outputs the voice information corresponding to one of the telephone number and the mail address of said originator as said incoming identification tone at the time of said incoming call.

5. The mobile communications terminal device according to claim 1, wherein said voice output means outputs the primary information regarding one of the discriminating ringing and the originator as the voice information instead of said incoming identification tone.

6. The device of claim 1, wherein said instruction comprises an input from a switch mounted on an exterior of said mobile communication terminal device.

7. The method of claim 1, wherein said outputting of said voice information is in response to an external instruction during said ringing.

8. The mobile communications terminal device of claim 1, further comprising means for receiving said character string from said user.

9. A method for identifying an incoming call in a mobile communications terminal device, said method comprising:
   ringing with a kind of an incoming identification tone corresponding to an originator at a time of an incoming call; and
   outputting a voice information corresponding to a character string registered beforehand by a user in a storage means for registering beforehand a name of the originator, one of a telephone number and a mail address of said originator, said kind of the incoming identification tone being output at the time of the incoming call, and said character string corresponding to the voice information designating said originator, in response to an instruction received from said user during the ringing of said incoming identification tone.

10. The method for identifying the incoming call in the mobile communications terminal device according to claim 9, wherein said outputting the voice information corresponding to said character string comprises outputting said voice information after stopping said ringing of said incoming identification tone in response to the instruction.

11. The method for identifying the incoming call in the mobile communications terminal device according to claim 9, wherein said outputting the voice information corresponding to said character string comprises outputting said voice information after reducing an output volume of ringing of said incoming identification tone in response to the instruction.

12. The method of claim 9, further comprising receiving said character string from said user before said ringing.

13. A method for identifying an incoming call in a mobile communications terminal device, said method comprising:
   outputting a voice information at a time of an incoming call in response to receiving an instruction from a user while receiving the incoming call, said voice information corresponding to a character string registered by said user beforehand in a storage means for registering beforehand a name of an originator, one of a telephone number and a mail address of said originator, a kind of an incoming identification tone at the time of the incoming call, and said character string corresponding to the voice information designating said originator.

14. A method for identifying an incoming call in a mobile communications terminal device, said method comprising:
   outputting a voice information corresponding to one of a telephone number and a mail address of an originator in response to receiving an instruction from a user while receiving the incoming call, a kind of an incoming identification tone at a time of the incoming call, and a character string from said user corresponding to the voice information designating said originator.

15. A communications terminal comprising:

a memory storing a character string input by a user for a calling party, said character string to be retrieved from said memory upon a receipt of a call from said calling party for outputting voice information and upon receipt of an instruction from a user during an incoming call.

16. The terminal of claim 15, further comprising:

a speaker; and a controller that controls said speaker to output said voice information in response to a call from said calling party based upon said character string that was stored before said call from said party and upon receipt of said instruction.

17. The terminal of claim 15, further comprising a converter that converts said character string into an analog voice waveform.

18. The terminal of claim 15, further comprising a switch to receive said instruction, and to control a retrieval of said character string and a conversion of said character string into an analog waveform.

19. The terminal of claim 15, further comprising a speaker in communication with said memory.

20. The terminal of claim 16, wherein said controller determines whether said call is from said party based upon caller identification data.

21. The terminal of claim 15, wherein said memory further stores a tone for said party.

22. The terminal of claim 16, wherein said controller controls said speaker to output said tone in response to a call from said party.

23. The terminal of claim 15, wherein said character string comprises a digitized voice signal.

24. The terminal of claim 15, wherein said memory comprises a telephone directory that stores said character string.

25. The terminal of claim 15, wherein said communications terminal comprises a mobile communications terminal.

26. A method for identifying a caller in a mobile terminal, comprising:

determining whether a memory includes a character string input by a user that corresponds to a caller; and outputting a voice signal that corresponds to said character string if said character string corresponds to said caller and in response to an instruction from said user during an incoming call from the caller.

27. The method of claim 26, further comprising receiving caller identification data and wherein said determining comprises determining whether said character string corresponds to said caller based upon said caller identification data.

28. The method of claim 26, further comprising storing said character string in a telephone directory before said determining.

29. The method of claim 28, further comprising:

storing a tone in said telephone directory;

determining whether said tone corresponds to said caller; and outputting said tone if said tone corresponds to said caller before outputting said voice signal.

30. The method of claim 26, further comprising initially running an identification tone in response to a call from said caller.

31. The method of claim 26, wherein the instruction comprises a prompt by a user for the output of the voice signal while an identification tone, corresponding to said caller, is ringing.

* * * * *